2,809,946

MOLDING COMPOSITIONS CONTAINING MINERAL FILLERS AND PRODUCTS PRODUCED THEREFROM

James R. Blegen, Schenectady, N. Y., and Thomas G. Custer, Stockbridge, Mass., assignors to General Electric Company, a corporation of New York No Drawing. Application November 10, 1954, Serial No. 468,155

20 Claims. (Cl. 260—22)

This invention relates to new and novel molding compositions and to products molded therefrom. More particularly, this invention relates to novel resinous compositions of matter and to articles molded therefrom, having improved water resistance and electrical properties, comprising mineral fibers, a polymerized, unsaturated polyester, and a lead salt.

Materials useful in fabricating parts for electrical use must have good electrical properties and good water resistance, i. e., low water absorption. Polymerizable, unsaturated polyesters, because they are resinous in character before polymerization and fusible at a temperature at which polymerization is not rapid, are highly advantageous as starting materials in the manufacture of products to be used for electrical purposes. Some of the more useful articles produced from unsaturated polyesters, particularly for electrical purposes, comprise an unsaturated polyester and a fibrous material usually in the form of a filler. The selection of the correct filler for a given unsaturated polyester is of prime importance, since all fibrous materials do not give satisfactory results. For example, although certain fibrous materials, such as cellulose fibers, impart great strength to such resins because the resins adhere well to the fibers, they are nevertheless unsatisfactory due to their natural affinity for water. Certain mineral fibers are suitable for making molded articles for electrical purposes because they do not possess a natural attraction for moisture. For example, Weaver Patent 2,549,732 discloses that certain crystalline fibrous materials such as the anhydrous silicates of divalent metals belonging to the pyrobole family are useful in the preparation of molded articles for electrical use. It is further disclosed that crystalline silicate mineral fibers belonging to the serpentine family, the most prevalent and most widely used member of which is chrysotile, are unsatisfactory for the same purposes. The serpentines, for example, chrysotile, are hydrous and are therefore distinguished from the pyroboles, which are anhydrous. The Weaver patent further discloses that while the pyroboles contribute greatly to the properties desired in molding compositions, materials comprising a polymerized unsaturated polyester and silicate fibers to which has been added an alkaline compound, for example, zinc oxide, have electrical properties and water resistance substantially better than any of the other products disclosed.

It now has been found that materials having superior electrical properties and water resistance can be produced by the addition of a lead salt to a composition comprising a polymerized unsaturated polyester and a silicate mineral fiber belonging to either the pyrobole or serpentine mineral families.

In accordance with the present invention, it has been found that if a lead salt is added to a molding composition comprising a polymerized unsaturated polyester, a silicate mineral fiber (with or without additional filler), and an alkaline material, for example, bases of metals of group II of the periodic table, superior water resistance and electrical properties are obtained.

It was most surprising and completely unpredictable, contrary to known prior art teaching and specifically the teaching of the Weaver patent, that not only the pyroboles but chrysotile asbestos, if acid-washed prior to use, can be used to advantage as the silicate mineral fiber in preparing molding compositions having excellent water resistance and electrical properties. While investigation has shown that compositions prepared with acid-washed chrysotile have better properties than compositions prepared with untreated chrysotile, even better products are obtained by adding a small quantity of a lead additive in the form of a lead salt to the composition containing acid-washed chrysotile.

The discovery that acid-washed chrysotile can be employed as a filler with polymerizable unsaturated polyesters in preparing molding compositions is of commercial and economic importance, because of its ready availability and low cost. Additionally, the simple acid-washing treatment does not add materially to the cost of the material.

It has also been found, in accordance with the present invention, that while the addition of a base of a group II metal to a molding composition comprising a polymerized, unsaturated polyester and a filler improves certain properties of the composition, for example, its water resistance, even better properties may be obtained in compounds of this type if a lead salt is employed in addition to the base. Test results show this to be the case with both acid-washed chrysotile and pyrobole type fillers.

The lead salts found eminently suitable in improving the water resistance and electrical properties of alkyd molding compositions made with either chrysotile asbestos, acid-washed in accordance with the present invention, or a pyrobole asbestos, include inorganic and organic compounds such as tribasic lead sulfate, dibasic lead phosphite, dibasic lead phthalate, dibasic lead stearate, etc. It will be obvious that the lead compounds listed are merely illustrative of the many lead salts coming within the scope of the present invention. Generally, the quantity of lead salt which may be employed in formulating the composition of the invention may range from 0.5 to about 30 percent, by weight of the resin. A preferred percentage of lead salt is from about 2 to 5 percent by weight of the resin.

As indicated earlier, materials found suitable as fillers in formulating the compositions of the invention may comprise a single filler, such as acid-washed chrysotile or any one of the pyrobole types of asbestos disclosed in the Weaver patent. Additionally, another filler may be substituted for part of the asbestos filler where additional characteristics in the final product are desired, for example, added improvement in hardness, strength and surface finish of the polymerized material. Materials which impart hardness, strength, and superior surface finish to the polymerized articles include clays, such as kaolin or china clay; carbonates, such as limestone, dolomite and whiting; nonfibrous silicates such as talc; silica, etc., in short, all finely powdered, inert, essentially insoluble, inorganic materials may be employed.

When a silicate fiber is employed as the sole filler, it may be used in amounts corresponding to from about 30 to 90 percent, by weight of the composition. The preferred range of silicate fibers is usually about 60 to 80 percent. When additional filler material is employed, optimum results are obtained by using a clay, for example, in a clay to fiber ratio ranging from about 0.5:1 to 3:1.

The polymerizable unsaturated alkyd resins employed in the present invention are the reaction products of polyhydric alcohols, mixtures of polyhydric alcohols, or mixtures of polyhydric and monohydric alcohols, and an aliphatic unsaturated alpha-beta polycarboxylic acid, or a plurality of polycarboxylic and monocarboxylic acids, one of which at least is an unsaturated polycarboxylic acid. Examples of polyhydric alcohols are ethylene glycol, di- and triethylene glycols, propylene glycol, butylene glycols, trimethylene glycol, tetramethylene glycol, pentamethylene glycol, glycerine, sorbitol, trimethylol ethane, or pentaerythritol, used either alone or in combination with a monohydric alcohol. Examples of alpha unsaturated, alpha-beta polycarboxylic acids which may be employed are maleic, fumaric, itaconic, citraconic, mesaconic acids, etc. The term "polycarboxylic acid" as used herein is intended to include within its meaning the anhydrides of such acids. In addition to one or more of the unsaturated polycarboxylic acids, saturated polycarboxylic acids may also be present in the reaction mixture in the preparation of the resins referred to above. Examples of such saturated polycarboxylic acids are succinic, adipic, azelaic, sebacic, etc. acids. Additionally, aromatic polycarboxylic acids such as phthalic, tetrachlorophthalic, tetrahydrophthalic, etc., may be employed.

A typical polyester may be prepared, for example, by charging a reactor with 111 parts of phthalic anhydride, 183 parts of maleic anhydride, 169 parts of ethylene glycol, 1 part of t-butyl catechol and 4 parts of xylene. After charging, the reactor is flushed with nitrogen and heating commenced, bringing the temperature up to 150° C. in approximately 45 minutes. 25 parts of 70 percent sorbitol are then added at such a rate that addition is complete in 15 minutes. At the end of approximately 2½ hours, maintaining a temperature of about 190° C., 1 part of xylene is added over a 10–15 minute period. The temperature is allowed to rise to approximately 200° C. and 2 parts of toluene added over a 15–20 minute period. Approximately 2 parts of benzene are thereafter added at a temperature of about 205° C. After removal of solvents, a polyester resin is obtained having an acid value of about 35 and a cure of 2 minutes on a 200° C. hot plate. Approximately 27 parts of zinc oxide are mixed in with the polyester at about 160° C. and stirred for about 20 to 30 minutes or until a 200° C. hot plate cure of 0.5 minute is obtained.

In addition to the unsaturated polyesters, another unsaturated compound is usually employed in formulating molding compositions of the invention. Suitable unsaturated compounds include polymerizable monomeric compounds, such as esters of unsaturated monohydric alcohols and polycarboxylic acids, including unsaturated polycarboxylic acids, halogenated aromatic polycarboxylic acids, and polybasic inorganic acids. Examples of such compounds are diallyl phthalate, diallyl succinate, diallyl maleate, diallyl fumarate, diallyl itaconate, diallyl chlorophthalate, triallyl cyanurate and triallyl phosphate. Other materials which may be incorporated with the unsaturated polyester include polymerizable esters of monohydric alcohols and unsaturated polycarboxylic acids capable of copolymerizing with unsaturated alkyd resins, such as, for example, dioctyl itaconate, dibenzyl itaconate, diethyl fumarate, and dibenzyl fumarate. Also, other polymerizable substances such as styrene, vinyl toluene, vinyl acetate, methyl methacrylate, etc. may be employed. The unsaturated polymerizable monomer may be used in an amount corresponding to from about 3 to about 50 percent, by weight of the unsaturated polyester.

Chrysotile asbestos may be rendered suitable for use in preparing the molding compositions of the invention by slurrying a mixture of chrysotile asbestos fibers and a dilute acid with mild heating. The slurry is then filtered, and the fibrous material water-washed, and reslurried in water. This operation may be repeated several times if necessary. The fibrous material is then dried at temperatures up to 125° C. As a more specific illustration, 500 grams of chrysotile asbestos floats are slurried with a 10 percent excess of 1 N $H_2SO_4$ for approximately 70 minutes at about 52° C. The slurry is then filtered, and the filter cake water-washed twice, and reslurried in water several times. The fibrous material is then dried at 125° C. The yield of treated asbestos is approximately 84 percent. The pH of the product, measured with a standard potentiometer pH meter, using 10 grams of asbestos stirred in 100 ml. of distilled water, was 6.5 as compared to the original untreated chrysotile of 9.8. Analysis of the untreated chrysotile showed it to have a reactive alkali content of approximately 14 percent, calculated as CaO. It can be seen readily that the acid-washing process removed essentially all of the reactive alkali present in the original chrysotile.

The compounding of molding compositions of the invention may be accomplished by any one of several known methods. For example, the polyester resin, fillers and other ingredients may be mixed together to form a molding composition by means of (1) a two-roll differential speed mill, (2) by kneading or equivalent action in a Banbury mixer, a sigma-blade mixer or similar device or (3) by dissolving resin and monomer (and a conventional catalyst if desired) in a volatile solvent, mixing with the insoluble ingredient into a paste or slurry, and subsequently removing the solvent.

Molding of compositions of the invention may be accomplished by conventional compression, transfer, injection or extrusion molding techniques. Compression molding is a preferred technique using temperatures of 275–340° F. and pressures of 500–5000 p. s. i.

In the following example in which all parts and percentages are by weight, improvements realized by acid-washing of chrysotile asbestos, for example, improvement in water resistance (i. e., percent water absorption) and in exudation, are illustrated by comparison of compositions containing unwashed chrysotile and acid-washed chrysotile. Water absorption was determined by immersing molded disks, 4 in. diameter by ⅛" thick, in water at room temperature for approximately 72 hours. "Exudation" refers to deposit on the surface of molded pieces of a soft, tacky substance resulting from hydrolytic breakdown of the polymerized polyester resin when subjected to high humidity and elevated temperature. The extent of exudation was determined by confining molded pieces in an atmosphere of 100 percent relative humidity at 40° C. to 55° C. for varying periods of time, and observing the surface appearance.

EXAMPLE 1

A polymerizable unsaturated polyester was prepared by reacting a charge consisting of 29.9 parts of phthalic anhydride, 31.3 parts of maleic anhydride, 17.6 parts of sorbitol, 32 parts of ethylene glycol and 0.28 part of t-butyl catechol under substantially the conditions previously described.

Employing the foregoing unsaturated polyester, two compositions were prepared differing only in the fiber employed, one with untreated chrysotile, and the other with an acid-washed chrysotile. In the following formulation, filler is meant to mean either washed or unwashed chrysotile.

| | Parts |
|---|---|
| Polyester resin | 26.8 |
| Blown diallyl phthalate | 8.6 |
| Benzoyl peroxide | 1.0 |
| Calcium stearate | 0.9 |
| Filler | 52.7 |

The foregoing formulation was compounded on a heated two-roll differential speed mill for 2–5 minutes at a temperature not exceeding 195° F. and removed in sheet form. After cooling, the sheets were granulated in a high speed cutter. Disks ⅛" thick for water absorption and exudation testing were cured for 1 minute at 2000 lb. per sq. in. of projected area.

Water absorption was determined by immersing molded disks in water at room temperature for approximately 72 hours. At the end of this period, the disk molded with the untreated asbestos showed a weight percent gain of 0.96 percent as against 0.6 percent for the disk molded with acid-washed chrysotile. The exudation appearance after 75 hours of the compound containing the untreated chrysotile was bad, whereas the appearance of that containing the washed asbestos was fair.

While the above comparison clearly indicates that the molding composition containing acid-washed chrysotile is far superior to that containing unwashed or untreated chrysotile in water absorption, it was found that further improved properties could be obtained by adding a base of a metal of group II, for example, zinc oxide, to the composition comprising acid-washed chrysotile as illustrated in the following example, all parts and percentages being by weight.

EXAMPLE 2

Zinc oxide corresponding to about 7 parts was cooked in with the resin formulation employed in Example 1. This resin was substituted for the resin in the molding composition of Example 1, and a disk molded in accordance with the technique of Example 1 was compared to the disk of Example 1 having acid-washed chrysotile but no zinc oxide. The percent water absorption at the end of 72 hours for the composition containing no zinc oxide was 0.6 as against 0.3 for the same composition containing the zinc oxide. The exudation appearance after 75 hours for the composition containing no zinc oxide was fair, as against good for the composition containing the zinc oxide. The difference in the water absorption of the two products is substantial and shows a decided advantage for the product containing the zinc oxide.

In addition to zinc oxide, further examples of bases of metals of group II which may be employed include oxides and hydroxides of beryllium, magnesium, calcium, zinc, strontium, cadmium and barium. Generally, any one of these bases may be used in preparing the resin in an amount corresponding to from 3 to 50 percent, by weight of the resin, with from about 4 to 10 percent, by weight of the resin, being preferred.

While the above examples clearly illustrate that a base of a metal of group II, for example, zinc oxide, materially improves the water resistance of molding compounds containing acid-washed chrysotile, it further has been found in accordance with this invention that a lead salt of the type previously described gives even greater improvement. This is illustrated in the following example, in which tribasic lead sulfate was employed as the lead salt, all parts and percentages being by weight.

EXAMPLE 3

A resin was formulated having the following composition:

| | Parts |
|---|---|
| Ethylene glycol | 30.5 |
| Phthalic anhydride | 29.9 |
| Maleic anhydride | 31.3 |
| "Sorbo"[1] (70% sorbitol) | 17.6 |
| Zinc oxide | 7 |

[1] Manufactured by Atlas Powder Company.

Employing the resin prepared in accordance with the first half of this example and the compounding technique of Example 1, two molding compositions were prepared having the following composition:

| | Composition No. 1, Parts | Composition No. 2, Parts |
|---|---|---|
| Resin | 26.8 | 26.8 |
| Acid-washed chrysotile | 59.6 | 62.7 |
| Blown diallyl phthalate | 8.6 | 8.6 |
| Calcium stearate | 0.9 | 0.9 |
| Benzoyl peroxide | 1.0 | 1.0 |
| Tribasic lead sulfate | 3.1 | |

Employing the tests described in the foregoing examples, composition No. 1 at the end of 72 hours showed 0.18 percent water absorption as against 0.32 percent for composition No. 2. The exudation appearance for composition No. 1 was good, whereas that for composition No. 2 was poor.

EXAMPLE 4

An unsaturated polyester was prepared having the following formulation:

| | Percent |
|---|---|
| Phthalic anhydride | 19.2 |
| Maleic anhydride | 38.0 |
| Ethylene glycol | 32.0 |
| Sorbo (70% sorbitol) | 5.0 |
| Tertiary butyl catechol | 0.3 |
| Zinc oxide | 5.5 |
| | 100.0 |

Using this resin, two compositions were prepared, one with washed and one with unwashed chrysotile asbestos (indicated as filler), as follows:

| | Parts |
|---|---|
| Resin | 21 |
| Diallyl phthalate (monomer) | 7 |
| Filler | 15.5 |
| Kaolin | 31.0 |
| A. A. Dolomite | 15.5 |
| Zinc oxide | 7 |
| Tribasic lead sulfate | 3 |
| Calcium stearate | 1.5 |
| Benzoyl peroxide | 2 |

The two formulations were compared with a commercially available alkyd molding composition containing a pyrobole asbestos, specifically Plaskon 420 supplied by Libbey-Owens-Ford, to show that molding compositions of the invention containing an acid-washed asbestos plus a lead compound have mechanical strength at least equal to or better than commercial grade molding compositions prepared with a pyrobole type asbestos. The superiority of the composition containing both acid-washed asbestos and a lead compound over the composition containing the lead compound and an unwashed asbestos, in both water absorption and humidity resistance, as well as flexural strength, is obvious. The comparisons are given in Table I.

*Table I*

| Fiber | Unwashed Chrysotile Floats | Washed Chrysotile Floats | Commercial Composition |
|---|---|---|---|
| Minimum disk cure, sec. | 10–15 | 10–15 | 10–15 |
| W. A., Percent, 72 hr. | .19 | .13 | .17 |
| Humidity resistance | Fair | Good | Good |
| Flexural strength, p. s. i. | 7,880 | 8,600 | 7,990 |
| Tensile strength, p. s. i. | 3,860 | 4,010 | 3,090 |
| Izod impact, ft. lb./in. | .35 | .35 | .37 |

The results tabulated above show that acid-washing of the asbestos does not affect mechanical strength, since both flexural strength and tensile strength of compositions containing acid-washed asbestos were superior to the other two tested. The humidity resistance and water absorption properties of the composition containing acid-washed chrysotile asbestos are comparable to the commercial grade tested and better than that containing the unwashed floats.

In the foregoing tests, flexural strength was determined by standard test procedure employing a molded bar 5" x ½" x ½", cured for 2 minutes at 2500 p. s. i. Tensile strength was also determined by standard tensile strength specifications with a molded piece having a cross section of 1" x ¼" cured for 2 minutes at 4500 p. s. i. Izod impact strength was determined by employing a notched bar, ½" x ½", cured for 2 minutes at 2500 p. s. i.

EXAMPLE 5

Two molding materials were prepared, each having compositions essentially the same as that listed in Example 4, except that 1.0 part iron oxide pigment and 0.1 part dark brown dye were added to each. One contained acid-washed chrysotile asbestos, the other unwashed asbestos. They were compared with the commercially available alkyd molding composition of Table I by testing for water absorption and humidity resistance as described above, and for electrical properties. Test results are listed in Table II.

*Table II*

| Fiber | Unwashed Chrysotile | Acid-Washed Chrysotile | Commercial Composition |
|---|---|---|---|
| Water absorption, Percent, 72 hr | .25 | .16 | .17 |
| Humidity resistance | Bad | Good | Excellent |
| Dielectric strength, 100° C. s/t | 379 vpm | 561 | 455 |
| 1 mc. power factor: | | | |
| dry | .019 | .016 | .016 |
| wet three days | .046 | .028 | .032 |
| 1 mc. Diel. constant: | | | |
| dry | 5.3 | 5.3 | 4.7 |
| wet three days | 5.8 | 5.6 | 5.0 |

Dielectric strength, power factor, and dielectric constant were determined according to standard ASTM test methods using 4" dia. x ⅛" thick molded disks.

EXAMPLE 6

The insulation resistances were compared of compositions containing unwashed chrysotile floats, acid-washed chrysotile floats, a composition prepared with a pyrobole type of asbestos known as Powminco 25-P supplied by the Powhatan Mining Corporation, and the commercially available alkyd molding composition of Examples 4 and 5. A resin having the following composition was employed in preparing the first three of these compositions.

| | Percent |
|---|---|
| Phthalic anhydride | 21.5 |
| Maleic anhydride | 35.5 |
| Ethylene glycol | 32.6 |
| Sorbo (70% sorbitol) | 4.8 |
| Tert. butyl catechol | 0.2 |
| Zinc oxide | 5.4 |
| | 100.0 |

Using the foregoing resin, the three compositions were prepared having the following formulation, the asbestos being unwashed chrysotile, washed chrysotile or Powminco 25-P.

| | Parts |
|---|---|
| Resin | 21.5 |
| Diallyl phthalate (blown) | 6.5 |
| Asbestos | 15.5 |
| Kaolin | 31.0 |
| A. A. Dolomite | 15.5 |
| Zinc oxide | 7 |
| Tribasic lead sulfate | 3 |
| Calcium stearate | 1.5 |
| Benzoyl peroxide | 2 |

The insulation resistances of the three compositions and of the commercially available alkyd molding composition were determined by placing molded disks 4" x ½", cured for 3 minutes at 3000 p. s. i. in sealed containers over water in an oven at approximately 70° C., these conditions being substantially 100 percent relative humidity. Results are tabulated below in Table III.

*Table III*

| Fiber | Unwashed Floats | Washed Floats | Powminco 25-P | Commercial Composition |
|---|---|---|---|---|
| Insulation resistance, megohms: | | | | |
| Dry | 2×10⁷ | 2×10⁷ | 2×10⁷ | 2×10⁷ |
| 1 day 160° F., 100% RH | 4×10⁵ | 1×10⁶ | 7.7×10⁵ | 3×10⁶ |
| 2 days 160° F., 100% RH | 9 | 1.4×10⁵ | 4.5×10⁵ | 2.4×10⁵ |
| 4 days 160° F., 100% RH | 0.6 | 80 | 330 | 4 |
| 7 days 160° F., 100% RH | | 13 | 18 | 0.4 |

These results show that the retention of insulation resistance of the composition containing acid-washed chrysotile asbestos was far superior at the end of the second day to that containing the unwashed asbestos, comparable to that containing the Powminco asbestos after 7 days, and superior to the commercially available molding composition tested.

In addition to improving the properties of compositions containing either acid-washed chrysotile or pyrobole type asbestos and an alkaline material such as zinc oxide, it has also been found that the lead salts improve the characteristics of compositions containing, in addition, another filler. The following examples are illustrative of compositions containing a lead salt and another filler in addition to the silicate fiber selected.

EXAMPLE 7

In this example, the effect of a lead salt, for example, tribasic lead sulfate, was observed in a composition compounded with the commercially available grade of asbestos identified as Powminco 25-P in which the resin had the following formulation:

| | Parts |
|---|---|
| Phthalic anhydride | 22.1 |
| Maleic anhydride | 36.5 |
| Ethylene glycol | 32.5 |
| Sorbo (70% sorbitol) | 5 |
| Tertiary butyl catechol | 0.28 |
| Zinc oxide | 5.5 |

A molding composition was prepared with this resin having the following formulation:

| | Parts |
|---|---|
| Blown diallyl phthalate | 23 |
| Resin | 89 |
| Powminco 25-P asbestos | 62 |
| McNamee clay | 124 |
| A. A. Dolomite | 62 |
| Zinc oxide | 28 |
| Tribasic lead sulfate | 12 |
| Calcium stearate | 4 |
| Benzoyl peroxide | 2.24 |

A specimen molded from this composition had a heat distortion point of 200° C. as compared to 173° C. for a product made with the commercial composition evaluated in Tables I, II and III. Additionally, the water absorption of the composition of the invention was superior to the commercial molding composition, specifically, 0.12 percent absorption in 72 hours as against 0.17 for the commercial molding composition. At the end of 9 days, the composition of the invention, held at 52.5° C. under nearly 100 percent relative humidity, showed no exudation, while under the same conditions the commercial composition showed bad exudation.

EXAMPLE 8

In Table IV are given the exudation and water absorption properties of compositions prepared with various lead salts using a resin prepared from the following formulation:

| | Parts |
|---|---|
| Maleic anhydride | 31.3 |
| Phthalic anhydride | 29.3 |
| Ethylene glycol | 30.5 |
| Sorbo (70% sorbitol) | 17.6 |
| Tert. butyl catechol | 0.28 |
| Zinc oxide | 7 |

Using the resin of the foregoing composition, molding compositions were prepared having the following formulation:

| | Parts |
|---|---|
| Polyester resin | 27 |
| Blown diallyl phthalate | 5 |
| Electrical-grade asbestos | 66.9 |
| Benzoyl peroxide | 1 |
| Lead additive | 3.1 |

*Table IV*

| Additive Composition | Exudation [1] at 40° C., 95–100% RH | | | | 72 hrs. Water Absorption, Percent |
|---|---|---|---|---|---|
| | 24 hrs. | 72 hrs. | 6 days | 8 days | |
| | None | Very slight tack. | Very slight tack. | Very slight tack. | 0.27 |
| Tribasic lead sulfate | do | None | Slight edges. | Slight edges. | 0.18 |
| Dibasic lead phthalate. | do | do | Very slight tack. | Very slight tack. | 0.20 |
| Dibasic lead phosphite. | do | do | None | Slight edges. | 0.20 |
| Dibasic lead stearate | do | do | Slight edges. | do | 0.17 |

[1] Where "slight" or "very slight" are designated, reference is to surface of the disk. In some cases, a tacky surface was noted and the sample is so listed. In other cases, the only effect to be seen was on the edges of disks which had previously been sawed. Thus, "slight edges" means slight exudate on the sawed edges only.

What we claim as new and desire to secure by Letters Patent of the United States is:

1. A molding composition comprising (1) as a binder, a polymerizable, unsaturated, polycarboxylic acid-polyhydric alcohol polyester and (2) as a filler therefor, acid-washed chrysotile fibers from which essentially all of the reactive alkali has been removed with dilute acid.

2. The molded product of the composition of claim 1.

3. A molding composition comprising (1) as a binder, a polymerizable, unsaturated, polycarboxylic acid-polyhydric alcohol polyester, (2) as a filler therefor, fibers of acid-washed chrysotile from which essentially all of the reactive alkali has been removed with dilute acid, and (3) a base of a metal of group II of the periodic system.

4. The molded product of the composition of claim 3.

5. A molding composition comprising (1) as a binder, a polymerizable, unsaturated, polycarboxylic acid-polyhydric alcohol polyester, (2) as a filler therefor, fibers of acid-washed chrysotile from which essentially all of the reactive alkali has been removed with dilute acid, and (3) zinc oxide.

6. The molded product of the composition of claim 5.

7. A molding composition comprising (1) as a binder, a polymerizable, unsaturated, polycarboxylic acid-polyhydric alcohol polyester, (2) a silicate fiber selected from the group consisting of pyroboles and chrysotile, (3) a base of a metal of group II of the periodic system and (4) a lead salt.

8. The molded product of the composition of claim 7.

9. A molding composition comprising (1) as a binder, a polymerizable, unsaturated, polycarboxylic acid-polyhydric alcohol polyester, (2) as a filler therefor, fibers of acid-washed chrysotile from which essentially all of the reactive alkali has been removed with dilute acid, (3) a base of a metal of group II of the periodic system and (4) a lead salt.

10. A molding composition comprising (1) as a binder, a polymerizable, unsaturated, polycarboxylic acid-polyhydric alcohol polyester, (2) as a filler therefor, fibers of acid-washed chrysotile from which essentially all of the reactive alkali has been removed with dilute acid, (3) zinc oxide and (4) a lead salt selected from the group consisting of tribasic lead sulfate, dibasic lead sulfate, dibasic lead phosphite, dibasic lead phthalate and dibasic lead stearate.

11. A molding composition comprising (1) as a binder, a polymerizable, unsaturated, polycarboxylic acid-polyhydric alcohol polyester, (2) as a filler therefor, fibers of acid-washed chrysotile from which essentially all of the reactive alkali has been removed with dilute acid, (3) zinc oxide and (4) tribasic lead sulfate.

12. A molding composition comprising (1) as a binder, a polymerizable, unsaturated, polycarboxylic acid-polyhydric alcohol polyester, (2) as a filler therefor, fibers of acid-washed chrysotile from which essentially all of the reactive alkali has been removed with dilute acid, (3) zinc oxide, and (4) dibasic lead phosphite.

13. A molding composition comprising (1) as a binder, a polymerizable, unsaturated, polycarboxylic acid-polyhydric alcohol polyester, (2) as a filler therefor, fibers of acid-washed chrysotile from which essentially all of the reactive alkali has been removed with dilute acid, (3) zinc oxide, and (4) dibasic lead phthalate.

14. A molding composition comprising (1) as a binder, a polymerizable, unsaturated, polycarboxylic acid-polyhydric alcohol polyester, (2) as a filler therefor, fibers of acid-washed chrysotile from which essentially all of the reactive alkali has been removed with dilute acid, (3) zinc oxide, and (4) dibasic lead stearate.

15. A molding composition comprising (1) as a binder, a polymerizable, unsaturated, polycarboxylic acid-polyhydric alcohol polyester, (2) as a filler therefor, fibers of a pyrobole asbestos, (3) a base of a metal of group II of the periodic system and (4) a lead salt.

16. A molding composition comprising (1) as a binder, a polymerizable, unsaturated, polycarboxylic acid-polyhydric alcohol polyester, (2) as a filler therefor, fibers of a pyrobole asbestos, (3) zinc oxide, and (4) a lead salt selected from the group consisting of tribasic lead sulfate, dibasic lead phosphite, dibasic lead phthalate and dibasic lead stearate.

17. A molding composition comprising (1) as a binder, a polymerizable, unsaturated, polycarboxylic acid-polyhydric alcohol polyester, (2) as a filler therefor, fibers of a pyrobole asbestos, (3) zinc oxide and (4) tribasic lead sulfate.

18. A molding composition comprising (1) as a binder, a polymerizable, unsaturated, polycarboxylic acid-polyhydric alcohol polyester, (2) as a filler therefor, fibers of a pyrobole asbestos, (3) zinc oxide and (4) dibasic lead phosphite.

19. A molding composition comprising (1) as a binder, a polymerizable, unsaturated, polycarboxylic acid-polyhydric alcohol polyester, (2) as a filler therefor, fibers of a pyrobole asbestos, (3) zinc oxide and (4) dibasic lead phthalate.

20. A molding composition comprising (1) as a binder, a polymerizable, unsaturated, polycarboxylic acid-polyhydric alcohol polyester, (2) as a filler therefor, fibers of a pyrobole asbestos, (3) zinc oxide and (4) dibasic lead stearate.

References Cited in the file of this patent

UNITED STATES PATENTS 2,680,722    Anderson    June 8, 1954

OTHER REFERENCES

Mellor: Inorganic and Theoretical Chemistry, 1925, vol. VI, page 426.